US008607063B2

(12) United States Patent
Ikeuchi

(10) Patent No.: US 8,607,063 B2
(45) Date of Patent: Dec. 10, 2013

(54) INFORMATION PROCESSING SYSTEM, IMAGE PROCESSING APPARATUS, INFORMATION PROCESSING APPARATUS, CONTROL METHOD THEREFOR AND COMPUTER-READABLE STORAGE MEDIUM

(75) Inventor: Yuma Ikeuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/422,035

(22) Filed: Mar. 16, 2012

(65) Prior Publication Data
US 2012/0272299 A1 Oct. 25, 2012

(30) Foreign Application Priority Data

Apr. 20, 2011 (JP) .................................. 2011-094369

(51) Int. Cl.
*G06F 21/00* (2013.01)
(52) U.S. Cl.
USPC ............................................. 713/185; 726/34
(58) Field of Classification Search
USPC .................. 726/16, 2, 34; 713/182, 183, 186
See application file for complete search history.

(56) References Cited

U.S. PATENT DOCUMENTS

2006/0226218 A1* 10/2006 Atobe et al. .................. 235/382
2006/0230286 A1* 10/2006 Kitada .......................... 713/186
2009/0310787 A1* 12/2009 Nishimi ........................ 380/277

FOREIGN PATENT DOCUMENTS

JP 2005-242994 A 9/2005

* cited by examiner

*Primary Examiner* — Edward Zee
(74) *Attorney, Agent, or Firm* — Carter, DeLuca, Farrell & Schmidt LLP

(57) ABSTRACT

There are provided an information processing system for providing a user with an authentication screen suitable for an authentication apparatus connected to an image processing apparatus, an image processing apparatus, an information processing apparatus, a control method therefor, and a program. When a user requests a login operation, the image processing apparatus generates a login request containing authentication apparatus information indicating an authentication apparatus for authenticating the user, which is connected to the image processing apparatus, and notifies the information processing apparatus of the login request. On the other hand, when the login request is sent, the information processing apparatus generates screen information of an authentication screen for executing authentication using the authentication apparatus indicated by the authentication apparatus information, and notifies the image processing apparatus of the generated screen information.

15 Claims, 14 Drawing Sheets

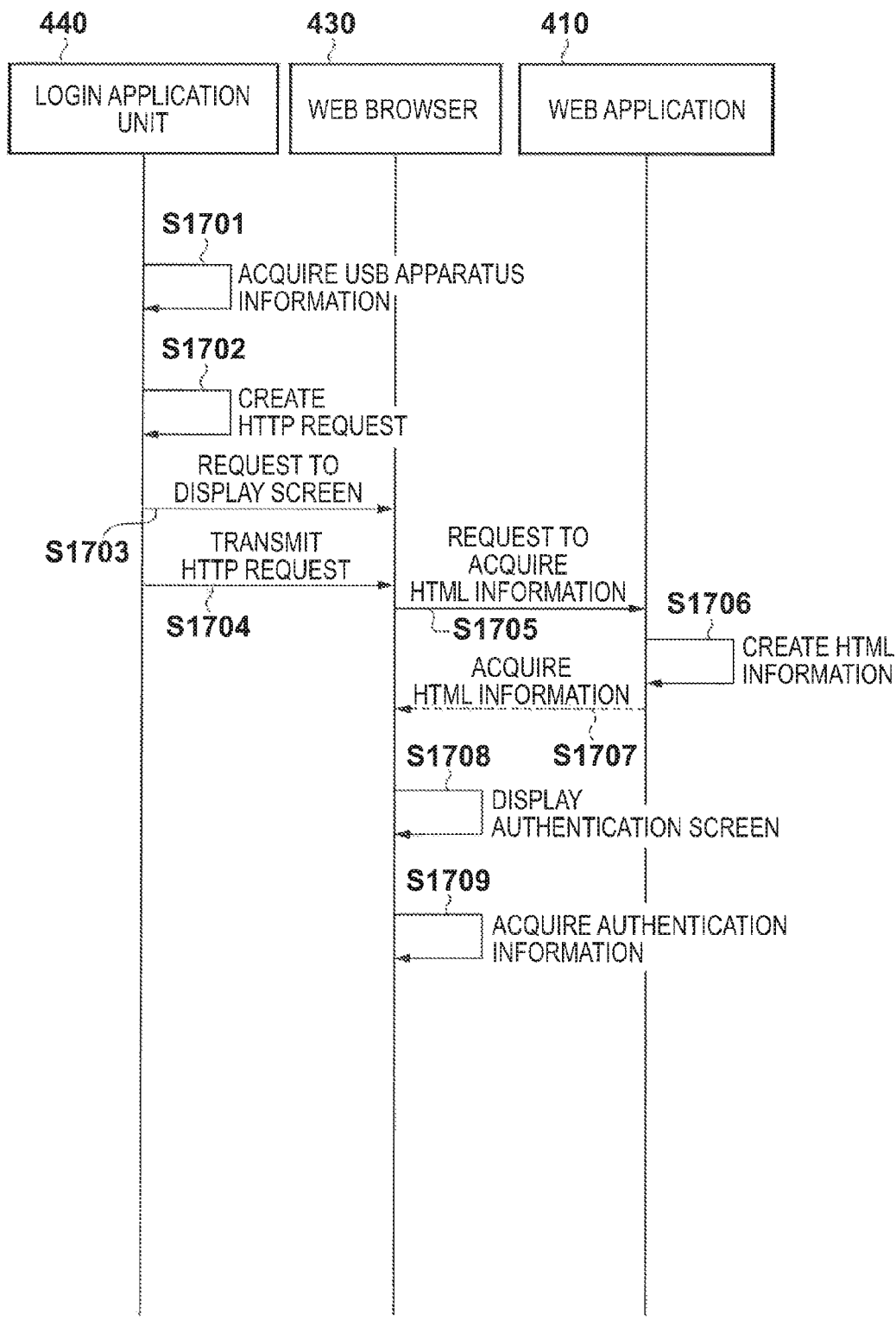

INFORMATION PROCESSING SYSTEM, IMAGE PROCESSING APPARATUS, INFORMATION PROCESSING APPARATUS, CONTROL METHOD THEREFOR AND COMPUTER-READABLE STORAGE MEDIUM

BACKGROUND OF THE INVENTION

1. Field of the Invention

The present invention relates to an information processing system, an image processing apparatus, an information processing apparatus, a control method therefor, and a computer-readable storage medium.

2. Description of the Related Art

A Web browser for browsing content on WWW (World Wide Web) displays information for identifying the storage position of a resource such as a URL (Uniform Resource Locator) for content or the path name of a file together with content on a display area such as an address bar. In recent years, with the higher-functionality of an image processing apparatus, such Web browsers have been installed on the apparatus, thereby enabling the user to connect to a network using the image processing apparatus. Japanese Patent Laid-Open No. 2005-242994 has proposed a Web server that provides an operation screen for inputting an instruction for using each function of an image processing apparatus.

As an application of this technique, a Web server provides user authentication processing and an authentication screen in an image processing apparatus, and the authentication screen is rendered on the Web browser of the image processing apparatus, thereby adapting an authentication operation to the Web. This eliminates the need to hold resources associated with authentication in the image processing apparatus, and also enables ready management of authentication on the Web server.

The conventional technique, however, has the following problem. Consider a case in which there are not one but multiple authentication methods of an image processing apparatus such as card authentication, key input authentication, and fingerprint authentication. In this case, a Web application must create screen information for each authentication method. Even when only one authentication apparatus is connected to the image processing apparatus, the Web application cannot recognize an authentication apparatus connected to the image processing apparatus, and therefore must provide a screen adapted to all authentication apparatuses. Since, with this operation, a screen containing authentication information for authentication apparatuses which are not connected is displayed, it may take a long time to execute an authentication operation for the image processing apparatus.

To deal with this problem, Japanese Patent Laid-Open No. 2005-242994 has proposed that the image processing apparatus notifies the Web server of a URL (information of a connection to a service provided by the image processing apparatus) as an item of information about the service. In Japanese Patent Laid-Open No. 2005-242994, however, the Web server is undesirably notified of the information of the image processing apparatus all the time. This may not only cause an increase in data transmission but also leak highly confidential information. Also, the user may reopen the login screen of the Web application using the Web browser after login, which means that a login operation may have to be performed multiple times.

SUMMARY OF THE INVENTION

The present invention enables realization of an information processing system for providing a user with an authentication screen suitable for an authentication apparatus connected to an image processing apparatus, an image processing apparatus, an information processing apparatus, a control method therefor, and a computer-readable storage medium.

One aspect of the present invention provides an information processing system in which an image processing apparatus and an information processing apparatus are communicably connected to each other, the image processing apparatus comprising an acquisition unit that acquires, when a user requests a login operation, authentication apparatus information indicating an authentication apparatus for authenticating the user from the authentication apparatus which is connected to the image processing apparatus, a login request unit that generates a login request containing the authentication apparatus information acquired by the acquisition unit to notify the information processing apparatus of the login request, and a display control unit that displays, as a response for the login request, an authentication screen on a display unit using screen information sent from the information processing apparatus, and the information processing apparatus comprising a screen information generation unit that generates, when the login request unit sends the login request, screen information of an authentication screen for executing authentication using the authentication apparatus indicated by the authentication apparatus information, and a screen information notification unit that notifies the image processing apparatus of the screen information, as a response for the login request, which has been generated by the screen information generation unit.

Another aspect of the present invention provides an image processing apparatus which is communicably connected to an information processing apparatus, comprising: an acquisition unit that acquires, when a user requests a login operation, authentication apparatus information indicating an authentication apparatus for authenticating the user from the authentication apparatus which is connected to the image processing apparatus; a login request unit that generates a login request containing the authentication apparatus information acquired by the acquisition unit to notify the information processing apparatus of the login request; and a display control unit that displays, as a response for the login request, an authentication screen on a display unit using screen information sent from the information processing apparatus.

Still another aspect of the present invention provides an information processing apparatus which is communicably connected to an image processing apparatus, comprising: a screen information generation unit that generates, when a login request for requesting a login operation of a user from the image processing apparatus, which contains authentication apparatus information indicating an authentication apparatus for authenticating the user, is received, screen information of an authentication screen for executing authentication using the authentication apparatus indicated by the authentication apparatus information; and a screen information notification unit that notifies the image processing apparatus of the screen information, as a response for the login request, which has been generated by the screen information generation unit.

Yet still another aspect of the present invention provides a control method for an information processing system in which an image processing apparatus and an information processing apparatus are communicably connected to each other, executing in the image processing apparatus, acquiring, by an acquisition unit, when a user requests a login operation, authentication apparatus information indicating an authentication apparatus for authenticating the user from the authentication apparatus which is connected to the image processing apparatus, generating, by a login request unit, a login request containing the authentication apparatus information acquired to notify the information processing apparatus of the login request, and displaying as a response for the login request, by a display control unit, an authentication screen on a display unit using screen information sent from the information processing apparatus, and in the information processing apparatus, generating, by a screen information generation unit, when the login request is sent in the generating by the login request unit, screen information of an authentication screen for executing authentication using the authentication apparatus indicated by the authentication apparatus information, and notifying, by a screen information notification unit, the image processing apparatus of the screen information, as a response for the login request, which has been generated in the generating by the screen information generation unit.

Yet still another aspect of the present invention provides a control method for an image processing apparatus which is communicably connected to an information processing apparatus, executing acquiring, by an acquisition unit, when a user requests a login operation, authentication apparatus information indicating an authentication apparatus for authenticating the user from the authentication apparatus which is connected to the image processing apparatus, generating, by a login request unit, a login request containing the authentication apparatus information acquired to notify the information processing apparatus of the login request, and displaying as a response for the login request, by a display control unit, an authentication screen on a display unit using screen information sent from the information processing apparatus.

Yet still another aspect of the present invention provides a control method for an information processing apparatus which is communicably connected to an image processing apparatus, executing generating, by a screen information generation unit, when a login request for requesting a login operation of a user from the image processing apparatus, which contains authentication apparatus information indicating an authentication apparatus for authenticating the user, is received, screen information of an authentication screen for executing authentication using the authentication apparatus indicated by the authentication apparatus information, and notifying, by a screen information notification unit, the image processing apparatus of the screen information, as a response for the login request, which has been generated in the generating.

Further features of the present invention will be apparent from the following description of exemplary embodiments with reference to the attached drawings.

BRIEF DESCRIPTION OF THE DRAWINGS

FIG. 14 is a sequence chart showing a series of processing operations of the information processing system when a USB authentication apparatus is taken out and put in according to the first embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Configuration of Information Processing System>

Figure 1:
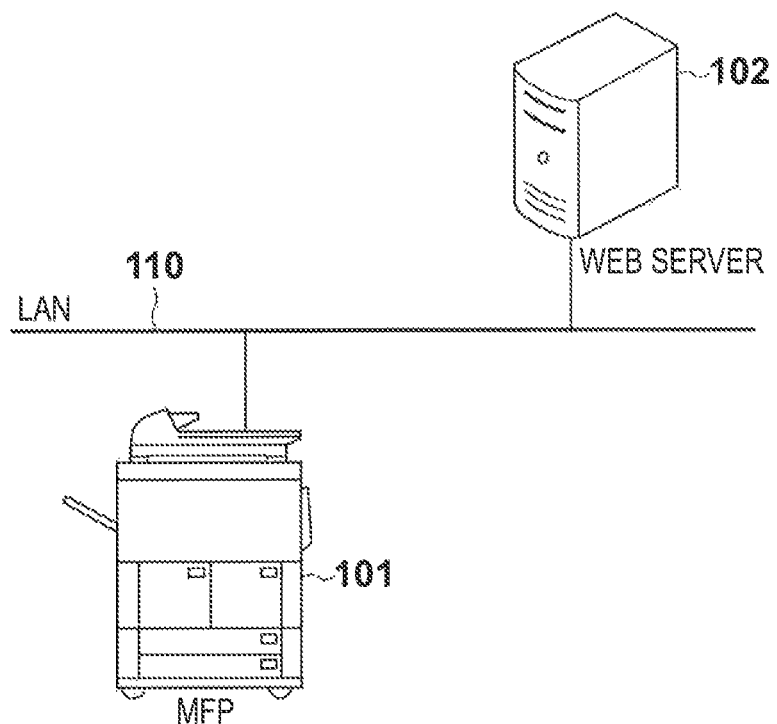
FIG. 1 is a view showing a configuration example of an information processing system according to the first embodiment.

The configuration of an information processing system according to the first embodiment of the present invention will now be described with reference to FIG. 1. An MFP 101 and a Web server 102 are communicably connected to a LAN 110. The LAN 110 is described as a LAN (Local Area Network) for descriptive convenience but may be another network such as the Internet.

<Arrangement of Image Processing Apparatus>

Figure 2:
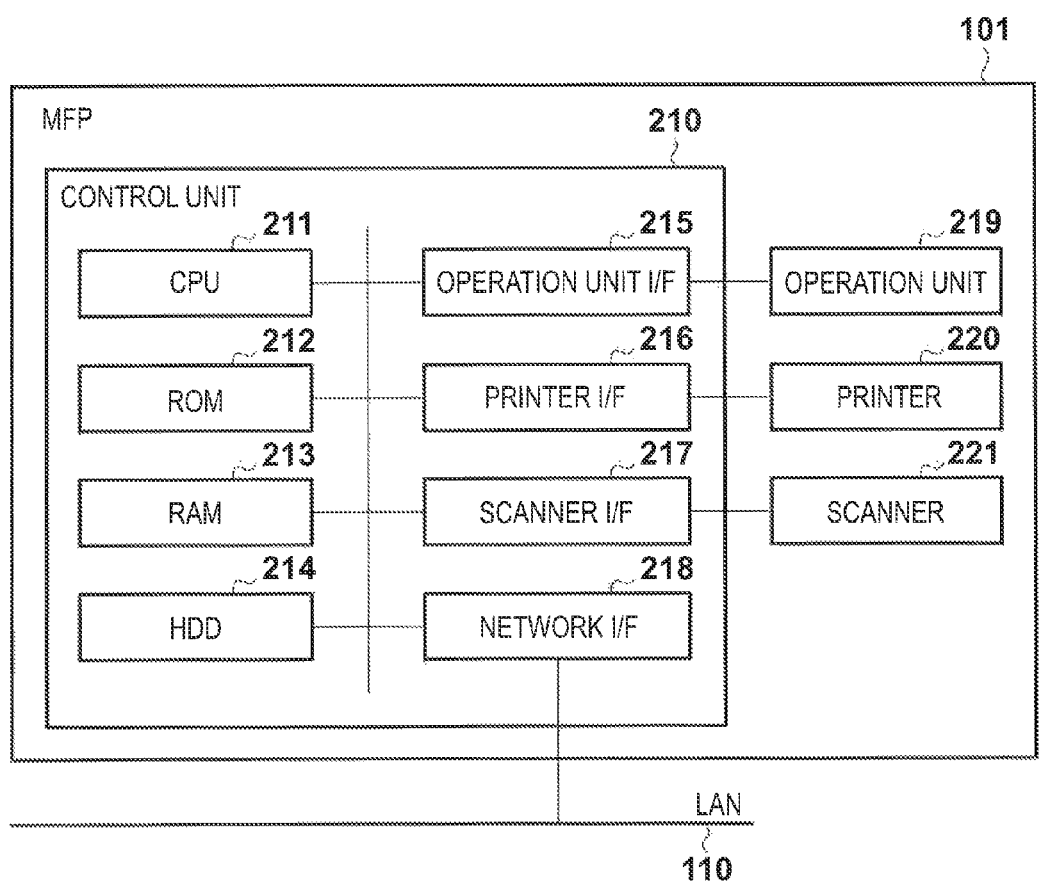
FIG. 2 is a block diagram showing an arrangement example of an MFP 101 according to the first embodiment.

The arrangement of the MFP 101 serving as an image processing apparatus will now be described with reference to FIG. 2. The MFP 101 includes a control unit 210, an operation unit 219, a printer 220, and a scanner 221. The control unit 210 includes a CPU 211, a ROM 212, a RAM 213, an HDD 214, an operation unit I/F 215, a printer I/F 216, a scanner I/F 217, and a network I/F 218. The control unit 210 including the CPU 211 comprehensively controls the operation of the MFP 101 as a whole. The CPU 211 performs various control operations such as a read control operation and a transmission control operation by reading out control programs stored in the ROM 212. The RAM 213 is used as a main memory for the CPU 211 and as a temporary storage area such as a work area.

The HDD 214 stores image data and various kinds of programs, or various kinds of information tables. The operation unit I/F 215 is connected to the operation unit 219 and control unit 210. The operation unit 219 includes a keyboard and a liquid crystal display unit having a touch panel function, and accepts an input from the user. That is, the operation unit 219 functions as an acceptance unit. The MFP 101 also includes a Web browser 430 (to be described later). The Web browser 430 of the MFP 101 serves as a display control unit which analyzes an HTML file received from the Web server 102 and then displays an operation screen based on the description of the received HTML file on the liquid crystal display unit of the operation unit 219. The HTML file (screen information) received by the Web browser 430 of the MFP 101 need not always be received from the Web server 102. That is, the HTML file may be received from a servlet application within the MFP 101 (to be described later).

The printer I/F 216 is connected to the printer 220 and control unit 210. Image data to be printed by the printer 220 is transferred from the control unit 210 via the printer I/F 216, and is printed on a storage medium by the printer 220. The scanner I/F 217 is connected to the scanner 221 and control unit 210. The scanner 221 reads an image on a document to generate image data, and inputs the image data to the control unit 210 via the scanner I/F 217. The network I/F 218 connects the control unit 210 (MFP 101) to the LAN 110. The network I/F 218 transmits image data and information to an external apparatus (for example, the Web server 102) on the LAN 110, and receives various kinds of information from an external apparatus on the LAN 110.

<Arrangement of Web Server>

Figure 3:
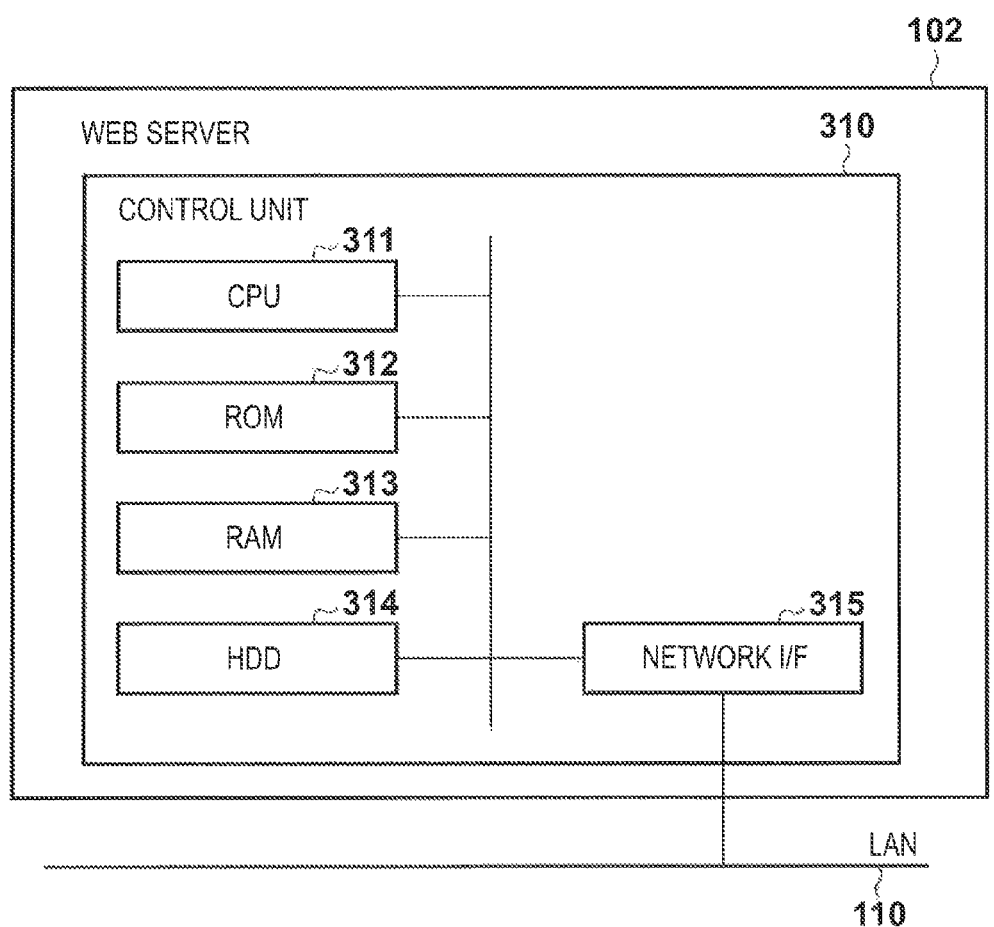
FIG. 3 is a block diagram showing an arrangement example of a Web server 102 according to the first embodiment.

The arrangement of the Web server 102 included in the information processing system will now be described with reference to FIG. 3. The Web server 102 includes a control unit 310. The control unit 310 includes a CPU 311, a ROM 312, a RAM 313, an HDD 314, and a network I/F 315. The control unit 310 including the CPU 311 comprehensively controls the operation of the Web server 102 as a whole. The CPU 311 performs various control processing operations by reading out control programs stored in the ROM 312. The RAM 313 is used as a main memory for the CPU 311 and as a temporary storage area such as a work area. The HDD 314 stores image data and various kinds of programs, or various kinds of information tables. The network I/F 315 connects the control unit 310 (Web server 102) to the LAN 110. The network I/F 315 transmits/receives various kinds of information to/from another apparatus on the LAN 110.

<Software Configuration of Information Processing System>

Figure 4:
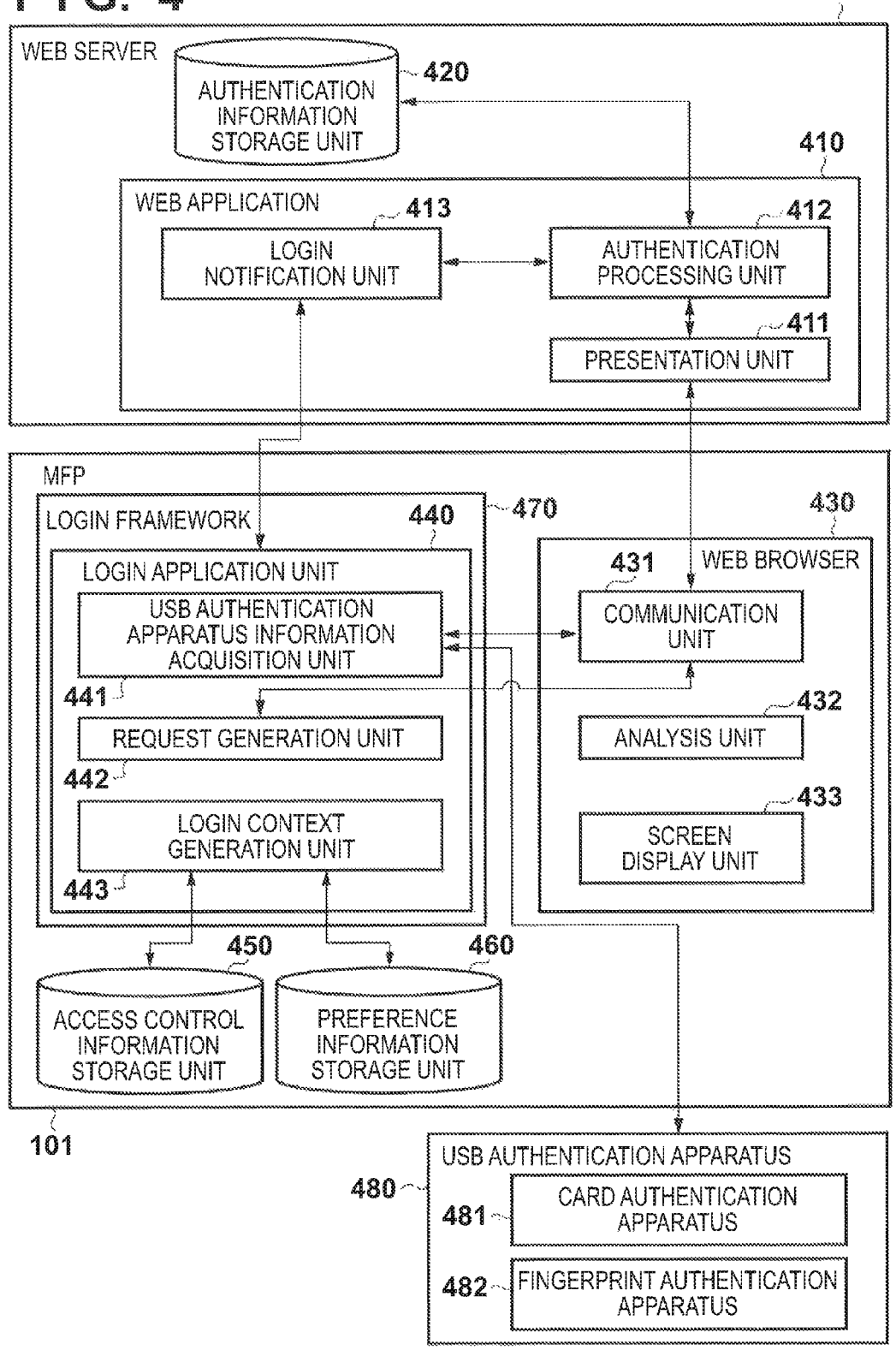
FIG. 4 is a view showing a software configuration example of the information processing system according to the first embodiment.

The software configuration of the whole information processing system will now be described with reference to FIG. 4. Each function unit (software) shown in FIG. 4 is implemented when the CPU of the MFP 101 or Web server 102 executes a control program. The MFP 101 includes the Web browser 430, a login application unit 440, an access control information storage unit 450, a preference information storage unit 460, and a login framework 470. Furthermore, the MFP 101 is connected to a USB (Universal Serial Bus) authentication apparatus 480.

The Web browser 430 includes a communication unit 431, an analysis unit 432, and a screen display unit 433. The communication unit 431 communicates with a presentation unit 411 of a Web application 410 via the HTTP protocol. More specifically, the communication unit 431 transmits a GET or POST HTTP request to a resource of the Web application 410 of the Web server 102 identified by a URI. That is, the Web browser 430 accesses using the specified URL as an access destination. The unit 431 acquires, as an HTTP response for the HTTP request, an operation screen described in HTML or the like to be displayed on the Web browser 430 from the Web application 410. The unit 431 also notifies, by an HTTP request, the Web application 410 of a user instruction input in an HTML form or the like displayed on the Web browser 430.

The analysis unit 432 analyzes an HTML file (screen information) received from the Web application 410. The HTML file contains a description representing the contents of an operation screen to be displayed on the Web browser. The screen display unit 433 displays the operation screen on the operation unit 219 based on the result of the analysis by the analysis unit 432. Such screen displayed based on the screen information (HTML file) received from the Web server 102 will be referred to as a Web browser screen.

The login application unit 440 includes a USB authentication apparatus information acquisition unit 441, a request generation unit 442, and a login context generation unit 443. The USB authentication apparatus information acquisition unit 441 detects a USB authentication apparatus 480 connected to the MFP 101, and acquires its information. When newly detecting a connection or a disconnection of the USB authentication apparatus 480, the unit 441 transmits USB authentication apparatus information to the request generation unit 442. The request generation unit 442 generates an HTTP request necessary for the Web browser 430 to communicate with the Web application 410. The request generation unit 442 receives the USB authentication apparatus information from the USB authentication apparatus information acquisition unit 441, and causes the communication unit 431 of the Web browser 430 to post the HTTP request having an HTTP request header with the received USB authentication apparatus information added. The login context generation unit 443 generates session information associated with a login user of which the unit 443 is notified by a login notification unit 413 of the Web application 410. The operation of each function of the MFP 101 is personalized according to the corresponding session information. That is, according to the contents of the preference information storage unit 460, an operation parameter which is preferred by the user has priority. Furthermore, an operation is prohibited or continued depending on the authority given to the user, which has been stored in the access control information storage unit 450.

The access control information storage unit 450 stores, for each of a plurality of users who use the MFP 101, access control information for controlling an access such as an execution, read, or write operation for each function or resource provided by the MFP 101. The access control information indicates, for example, that color processing is prohibited but black and white processing is permitted, that single-sided printing is prohibited but drawing printing is permitted, that transmission of a document is prohibited but a copy is permitted, that a change to an administrator setting parameter is prohibited but a change to a general user setting parameter is permitted, and the like. A system administrator can preset the access control information in the access control information storage unit 450. Furthermore, the Access Control List (ACL) or the like, which is stored in an external server and managed by the external server, can be configured to be used via a network.

The preference information storage unit 460 stores, for each of a plurality of users who use the MFP 101, preference information indicating various preferences associated with the operation of the MFP 101. The preference information indicates, for example, that black and white processing is preferred over color processing, that a letter size is preferred over an A4 size with respect to a paper size, that transmitting data without checking a preview of a read image is preferred over transmitting data after checking the preview, and the like. The user or administrator can preset the preference information in the preference information storage unit 460. It is also possible to automatically determine preferences based on the past operation history of the user, and to automatically set the determined preferences in the preference information storage unit 460. The login framework 470 manages the login application unit 440, and sends a login request to the login application unit 440.

The USB authentication apparatus 480 is connected to the MFP 101, and includes a card authentication apparatus 481 and a fingerprint authentication apparatus 482. The card authentication apparatus 481 accepts an input using an ID card from the user, and notifies the USB authentication apparatus information acquisition unit 441 of authentication information contained in the card. The fingerprint authentication apparatus 482 accepts user fingerprint information, of which it then notifies the USB authentication apparatus information acquisition unit 441.

The Web server 102 includes the Web application 410 and an authentication information storage unit 420. The Web application 410 includes the presentation unit 411, an authentication processing unit 412, and the login notification unit 413. The presentation unit 411 communicates with the communication unit 431, and transmits an operation screen to be displayed on the Web browser 430 of the MFP 101 to the MFP 101 in response for a request from the MFP 101. The unit 411 also receives, as an HTTP request from the MFP 101, a user instruction which has been input through the operation screen displayed on the Web browser 430 of the MFP 101. At this time, the presentation unit 411 analyzes an HTTP request header received from the communication unit 431. If, as a result of the analysis, the request header contains USB authentication apparatus information, the presentation unit 411 transmits an authentication screen corresponding to the USB authentication apparatus 480 to the communication unit 431. For example, if the request header contains card authentication apparatus information, the unit 411 transmits a card authentication screen. If the request header contains fingerprint authentication apparatus information, the unit 411 transmits a fingerprint authentication screen. Furthermore, if the communication unit 431 transmits authentication information through the authentication screen displayed on the Web browser 430, the unit 411 transmits the authentication information to the authentication processing unit 412, and causes the unit 412 to execute authentication processing. That is, the presentation unit 411 functions as a screen information generation unit for generating screen information of an authentication screen in response for a login request from the MFP 101, and functions as a screen information notification unit for notifying the MFP 101 of the screen information.

The authentication processing unit 412 collates the authentication information received from the presentation unit 411 with information of the authentication information storage unit 420, thereby executing authentication processing. Note that the authentication information storage unit 420 stores user names registered in advance and corresponding passwords. If, as a result of the collation, the authentication information received from the presentation unit 411 is valid, the unit 412 causes the login notification unit 413 to send information indicating that the login operation has succeeded. Alternatively, if the authentication information is invalid, the unit 412 causes the presentation unit 411 to display login error information. If, as a result of the authentication collation by the authentication processing unit 412, the authentication information input by the user through the Web browser 430 exists in the authentication information storage unit 420, the login notification unit 413 notifies the login application unit 440 that the login operation has succeeded. This permits the user to use the MFP 101. That is, the authentication processing unit 412 functions as an authentication unit for executing authentication of the user using the authentication information sent from the MFP 101 and the information stored, in advance, in the authentication information storage unit 420, and functions as an authentication result notification unit for notifying the MFP 101 of an authentication result.

<Screen Examples>

Figure 5:
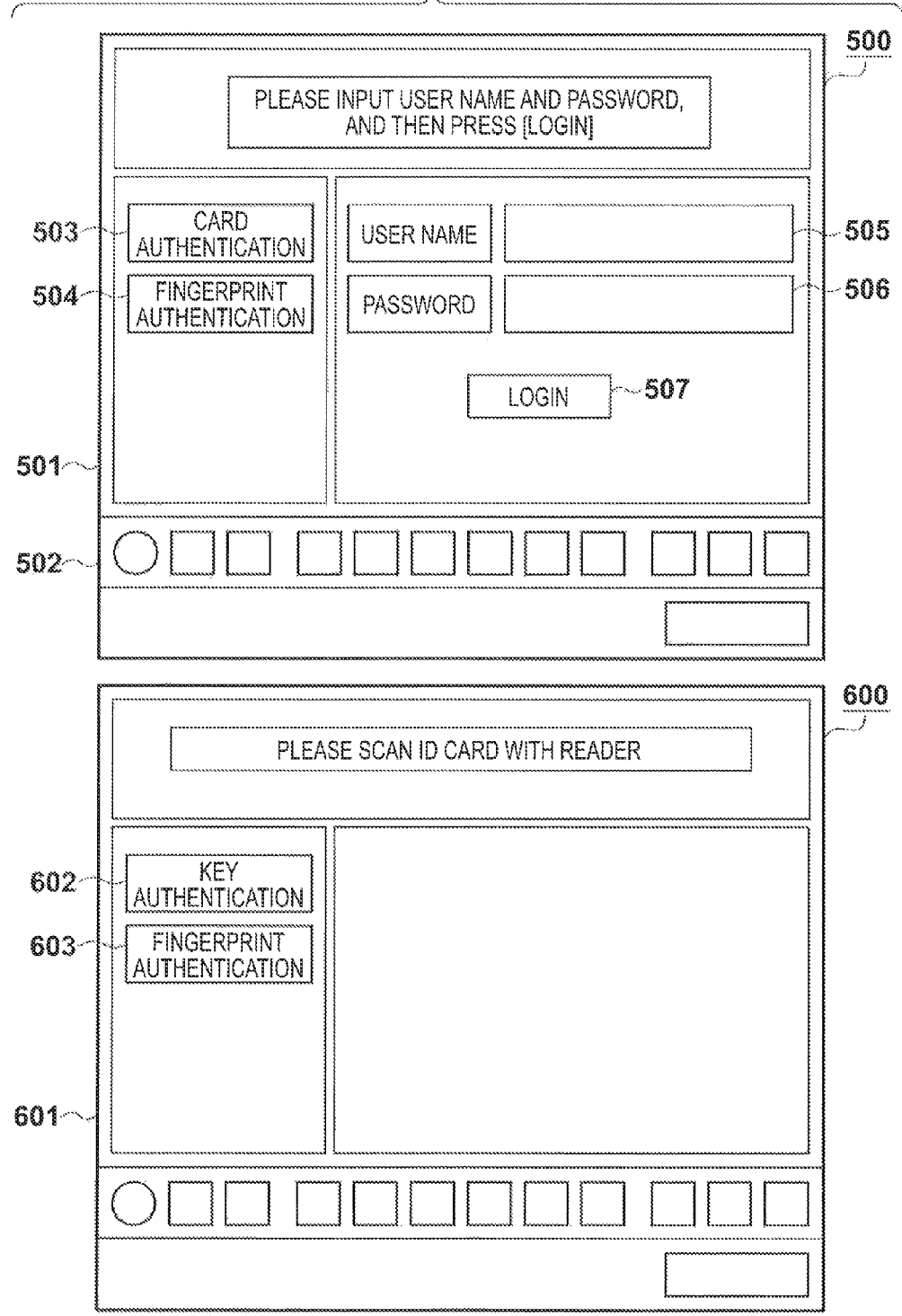
FIG. 5 is a view showing authentication screen examples according to the first embodiment.

Screens displayed on the Web browser 430 will now be described with reference to FIGS. 5 to 7. Referring to FIG. 5, reference numeral 500 denotes the outer appearance of the Web browser 430 on which a key authentication screen is rendered when the communication unit 431 of the Web browser 430 communicates with the presentation unit 411 of the Web server 102. Reference numeral 501 denotes a content display area of the Web browser 430 in which content is displayed based on a response received from the Web server 102. In the key authentication screen 500, the screen information of the screen is transmitted by the presentation unit 411, received by the communication unit 431, analyzed by the analysis unit 432, and then rendered in the content display area 501 by the screen display unit 433.

Reference numeral 502 denotes a tool bar on which operation buttons for controlling display content and controlling the Web browser are displayed. When the operation button is selected, a corresponding function is executed. Reference numeral 503 denotes a button for switching to a card authentication screen 600. The button 503 is displayed only when the HTTP request header transmitted to the presentation unit 411 of the Web application 410 from the communication unit 431 of the Web browser 430 contains information of the card authentication apparatus. Reference numeral 504 denotes a button for switching to a fingerprint authentication screen 700. Similarly to the card authentication screen switching button 503, the button 504 is displayed only when the HTTP request header received by the presentation unit 411 contains information of the fingerprint authentication apparatus.

Reference numeral 505 denotes a user name input field in key authentication. The use of the MFP 101 can execute key authentication by inputting a user name in this field. Reference numeral 506 denotes a password input field in key authentication. The user of the MFP 101 can execute key authentication by inputting a password in this field. Reference numeral 507 denotes a login button in key authentication. When this button is pressed, the values input in the user name input field 505 and password input field 506 are acquired and transmitted to the presentation unit 411 of the Web server 102.

The screen 600 of FIG. 5 represents the outer appearance of the Web browser 430 when the communication unit 431 of the Web browser 430 communicates with the presentation unit 411 of the Web server 102, and the card authentication screen is rendered. Reference numeral 601 denotes a content display area of the Web browser 430 in which content is displayed based on a response received from the Web server 102. In the card authentication screen 600, the screen information of the screen is transmitted by the presentation unit 411, received by the communication unit 431, analyzed by the analysis unit 432, and then rendered in the content display area 601 by the screen display unit 433. Reference numeral 602 denotes a button for switching to the key authentication screen 500. This button is always displayed on the card authentication screen 600. Reference numeral 603 denotes a button for switching to the fingerprint authentication screen 700.

Figure 6:
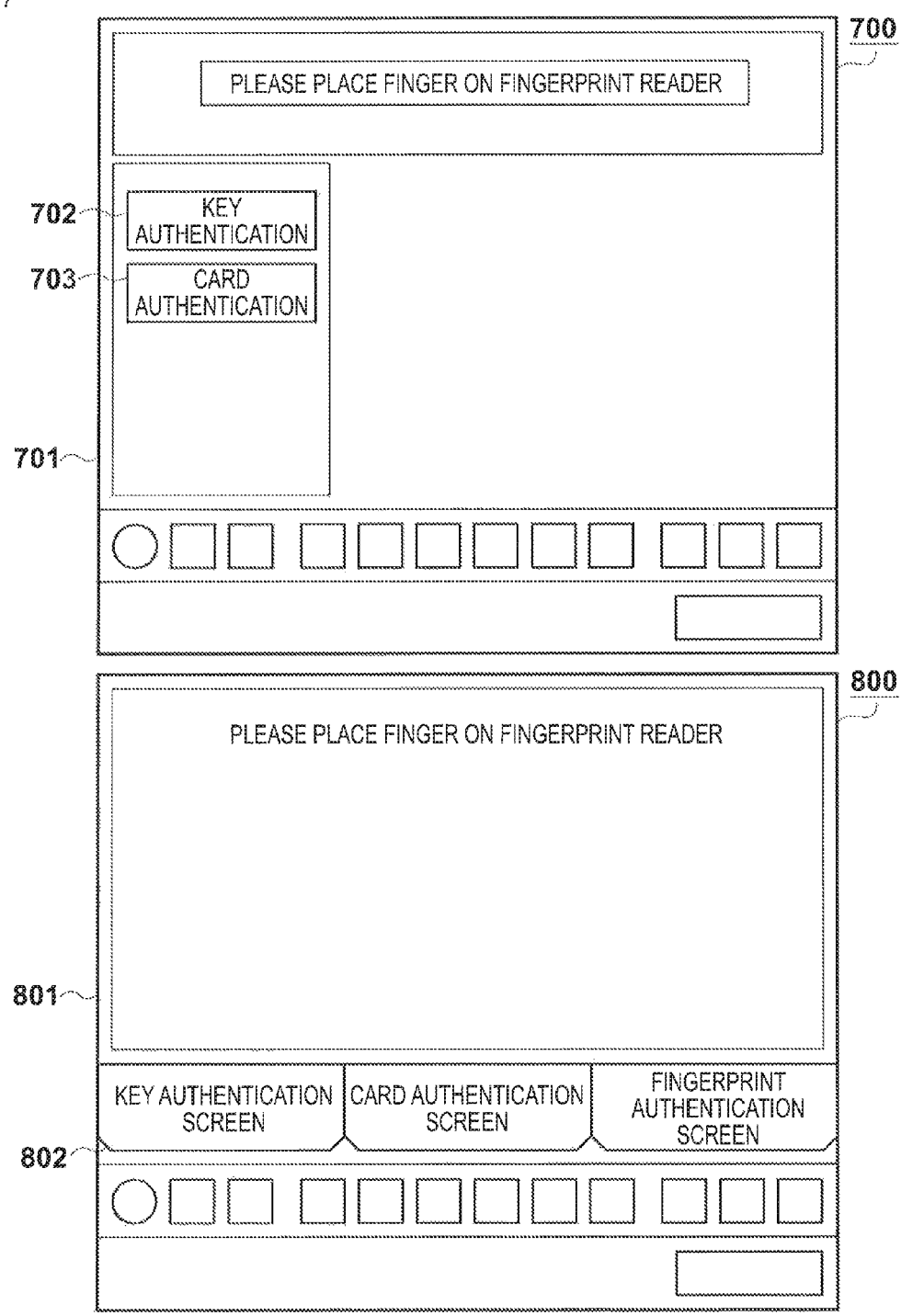
FIG. 6 is a view showing authentication screen examples according to the first embodiment.

The screen 700 of FIG. 6 represents the outer appearance of the Web browser 430 when the communication unit 431 of the Web browser 430 communicates with the presentation unit 411 of the Web server 102, and the fingerprint authentication screen is rendered. Reference numeral 701 denotes a content display area of the Web browser 430 in which content is displayed based on a response received from the Web server 102. In the fingerprint authentication screen 700, the screen information of the screen is transmitted by the presentation unit 411, received by the communication unit 431, analyzed by the analysis unit 432, and then rendered in the content display area 701 by the screen display unit 433. Reference numeral 702 denotes a button for switching to the key authentication screen 500. This button is always displayed on the fingerprint authentication screen 700. Reference numeral 703 denotes a button for switching to the card authentication screen 600. As described above, each of the authentication screens 500, 600, and 700 corresponds to one authentication apparatus. When multiple other authentication apparatuses are connected to the MFP 101, each authentication screen includes link buttons to authentication screens corresponding to the authentication apparatuses.

Reference numeral 800 of FIG. 6 denotes the outer appearance of the Web browser 430 when the communication unit 431 of the Web browser 430 communicates with the presentation unit 411 of the Web server 102, and the key authentication screen 500, card authentication screen 600, and fingerprint authentication screen 700 are rendered in a tab format. Reference numeral 801 denotes a content display area of the Web browser 430. Reference numeral 802 denotes a tab display area of the Web browser. In this example, since the fingerprint authentication screen 700 is selected, it is displayed in the content display area 801. Note that the screen 800 will be described in detail in the second embodiment.

Figure 7:
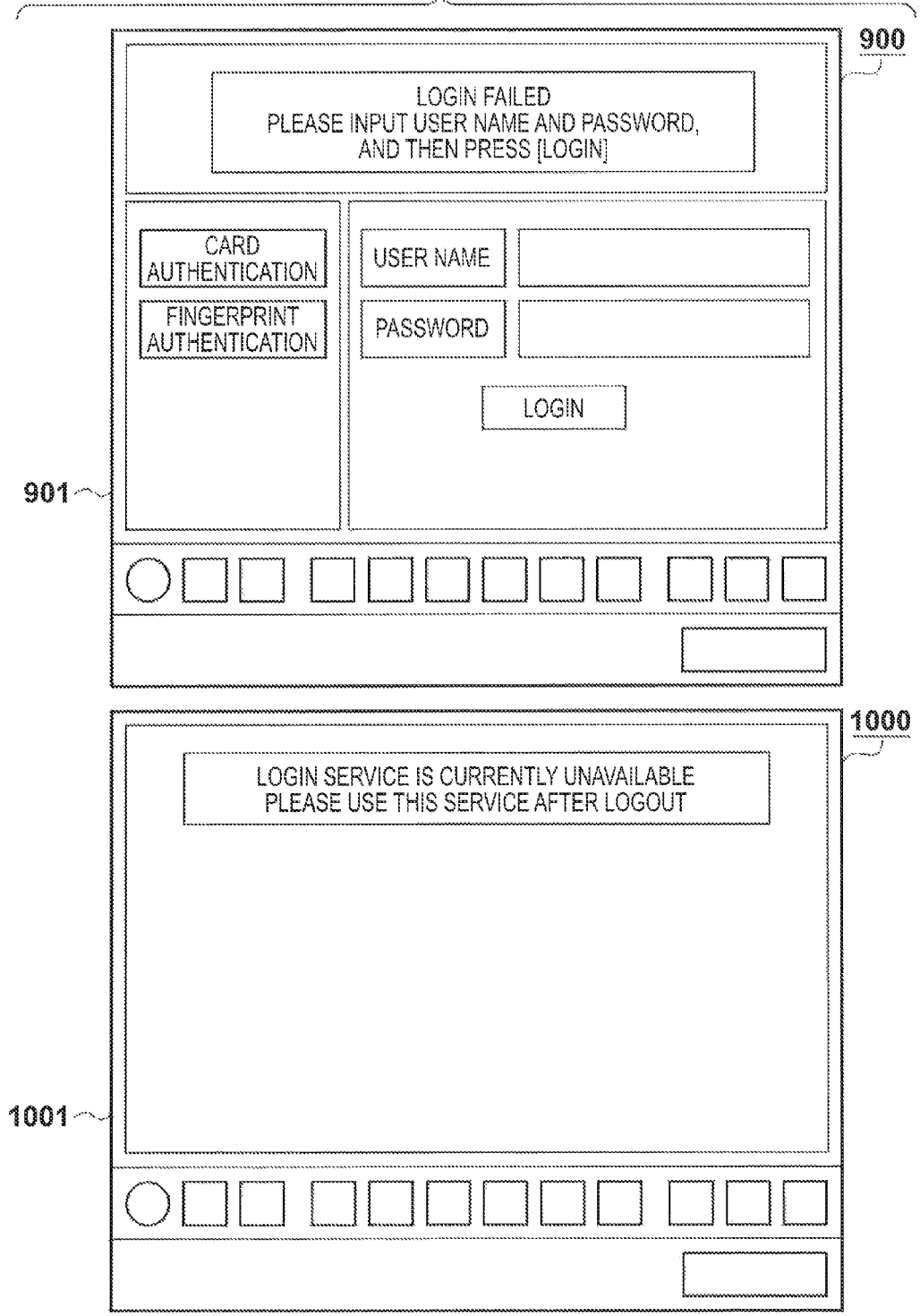
FIG. 7 is a view showing error screen examples according to the first embodiment.

Reference numeral 900 of FIG. 7 denotes the outer appearance of the Web browser 430 when the communication unit 431 of the Web browser 430 communicates with the presentation unit 411 of the Web server 102, and a screen in the event of login failure is rendered. Reference numeral 901 denotes a content display area of the Web browser 430. Reference numeral 1000 of FIG. 7 denotes outer appearance of the Web browser 430 when the communication unit 431 of the Web browser 430 communicates with the presentation unit 411 of the Web server 102, and an error screen in exclusive processing is rendered. When a login service is accessed even though a login operation is complete, this screen is displayed. Reference numeral 1001 denotes a content display area of the Web browser 430.

<Authentication Processing>

Figure 8:
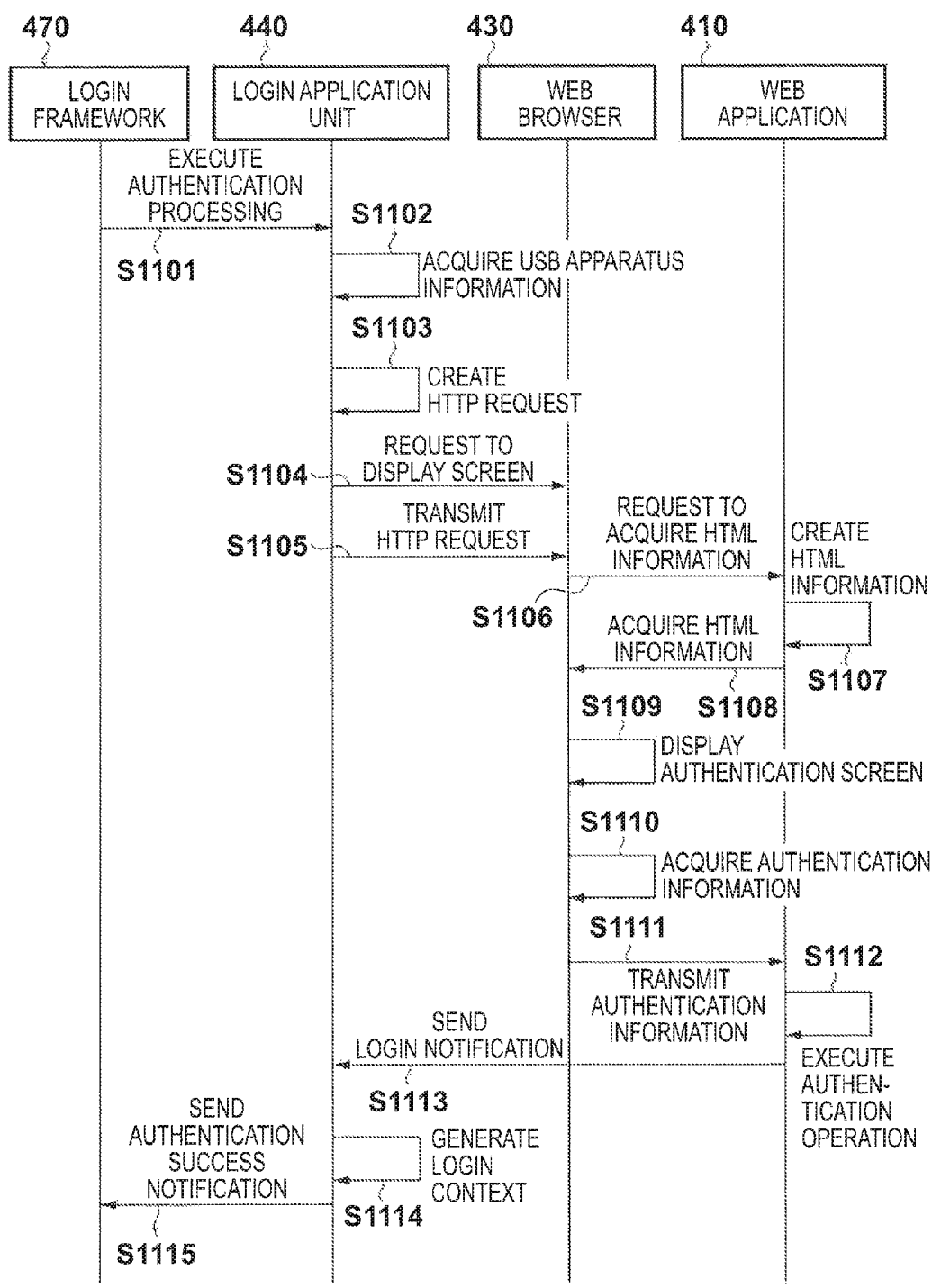
FIG. 8 is a sequence chart showing a series of processing operations of the information processing system according to the first embodiment.

Processing from when the login framework 470 requests authentication processing of the login application unit 440 until a response indicating authentication success is returned in this embodiment will now be described with reference to FIG. 8. Note that the processing to be explained below is implemented when the CPU 211 of the MFP 101 or the CPU 311 of the Web server 102 reads out and executes a control program stored in the ROM 212 or 312 or the like.

In step S1101, the login framework 470 sends an authentication processing request to the login application unit 440. In step S1102, the login application unit 440 causes the USB authentication apparatus information acquisition unit 441 to acquire information of the USB authentication apparatus 480 connected to the MFP 101. In step S1103, the login application unit 440 creates an HTTP request for the Web browser 430 to connect with the Web application 410. At this time, the request is created by describing the USB authentication apparatus information acquired in step S1102 in a request header. Furthermore, the login application unit 440 requests the Web browser 430 to display an authentication screen in step S1104, and transmits the HTTP request created in step S1103 to the Web browser 430 in step S1105.

In step S1106, the Web browser 430 sends an html acquisition request for rendering the authentication screen to the Web application 410 according to the HTTP request transmitted in step S1105. Upon receiving the html acquisition request, the Web application 410 creates html information in step S1107, and returns the created html information to the Web browser 430 in step S1108.

Upon acquiring the html information, the Web browser 430 displays the key authentication screen 500 on the display unit in step S1109. When the button 503 for switching to the card authentication screen 600 is pressed, the Web application 410 executes processing shown in FIG. 10 (to be described later). Similarly, when the button 504 for switching to the fingerprint authentication screen 700 is pressed, the Web application 410 executes processing shown in FIG. 11 (to be described later). In each case, the processing procedure of the Web application 410 is similar to that shown in FIG. 9, and no button for switching to each authentication method is created but a button for switching to key authentication is created instead. When the USB authentication apparatus 480 is taken out and put in while an authentication screen is displayed, the login application unit 440 notifies the Web browser 430 of new USB authentication apparatus information, and updates the authentication screen. FIG. 14 shows this procedure. Steps S1701 to S1709 of FIG. 14 are the same as steps S1102 to S1109 of FIG. 8, and this Processing causes the Web browser 430 to always render an authentication screen corresponding to the latest state of the USB authentication apparatus 480.

In step S1110, the Web browser 430 acquires authentication information input by the user. Upon acquiring the authentication information, the Web browser 430 serves as an authentication information notification unit, and transmits the authentication information acquired in step S1110 to the Web application 410 in step S1111. In step S1112, the Web application 410 executes an authentication operation of the authentication information which has been transmitted from the Web browser 430 in step S1111. If the authentication operation in step S1112 has succeeded, the Web application 410 sends a login notification indicating permission of user login to the login application unit 440 in step S1113.

In step S1114, the login application unit 440 causes the login context generation unit 443 to generate a login context containing session information of the user. In step S1115, the login application unit 440 sends an authentication success notification to the login framework 470.

The processing from when the login framework 470 requests authentication processing of the login application unit until a response indicating authentication success is returned has been described. This implements the procedure for executing authentication after the Web browser 430 provides the user with an appropriate authentication screen based on the information of the USB authentication apparatus connected to the MFF 101.

<Creation of Screen Information>

Figure 9:
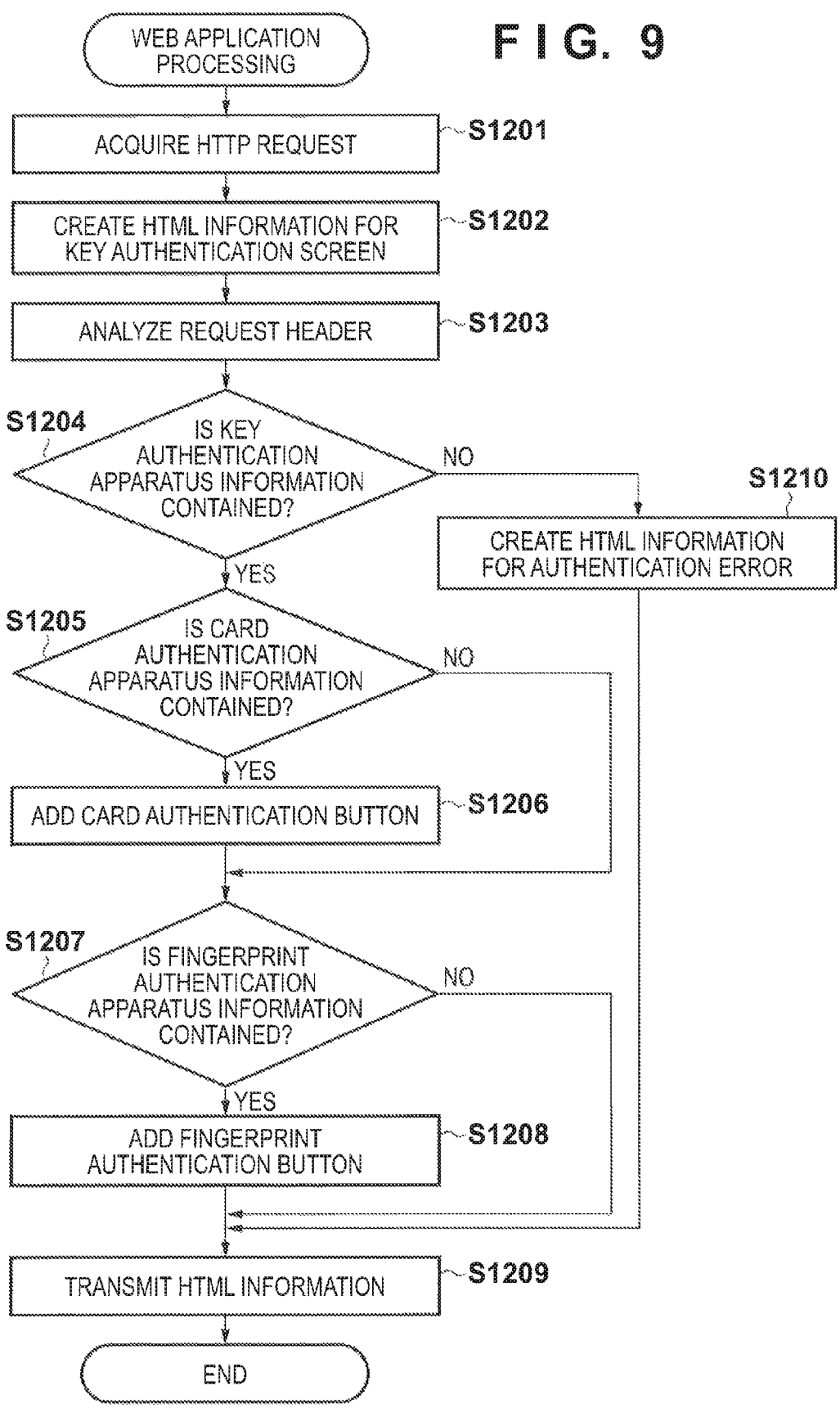
FIG. 9 is a flowchart illustrating key authentication screen creation processing by a Web application 410 according to the first embodiment.

Creation processing of creating html information as screen information in the Web application 410 will now be described with reference to FIGS. 9 to 11. Note that the processing to be explained below is implemented when the CPU 311 of the Web server 102 reads out and executes a control program stored in the ROM 312 or the like. Processing when the Web application 410 receives the html acquisition request sent from the Web browser 430 in step S1106 will be described first with reference to FIG. 9.

In step S1201, the Web application 410 acquires the HTTP request which has been transmitted by the Web browser 430 in step S1106. In step S1202, the Web application 410 creates html information (screen information) of the key authentication screen 500 to be displayed on the Web browser 430. In step S1203, the Web application 410 analyzes the header of the HTTP request received in step S1201. In step S1204, the Web application 410 determines, as a result of the analysis in step S1203, whether the request header contains key authentication apparatus information. If the header contains key authentication apparatus information, the process advances to step S1205; otherwise, the process advances to step S1210. In step S1210, the Web application 410 recreates html information for an authentication error based on the html information created in step S1202, and advances the process to step S1209. The fact that the request header contains no key authentication apparatus information implies that the user has accessed through the Web browser 430 after login. To prevent a login operation from being performed multiple times, processing of switching to an error page (the error screen 1000) is executed.

In step S1205, the Web application 410 determines whether the request header contains card authentication apparatus information. If the header contains card authentication apparatus information, the process advances to step S1206; otherwise, the process advances to step S1207. In step S1206, the Web application 410 adds a link button to a card authentication service (the card authentication screen 600) to the html information for the key authentication screen, which has been created in step S1202, and then advances the process to step S1207.

In step S1207, the Web application 410 determines whether the request header contains fingerprint authentication apparatus information. If the header contains fingerprint authentication apparatus information, the process advances to step S1208; otherwise, the process advances to step S1209. In step S1208, the Web application 410 adds a link button to a fingerprint authentication service (the fingerprint authentication screen 700) to the html information for the key authentication screen, which has been created in step S1202, and then advances the process to step S1209. In step S1209, the Web application 410 transmits the created html information for the key authentication screen to the Web browser 430, and then ends the processing.

Creation of html information for the card authentication screen 600 and creation of html information for the fingerprint authentication screen 700 will now be described with reference to FIGS. 10 and 11. Note that the html information creation processing shown in FIG. 10 or 11 is almost the same as that shown in FIG. 9. Thus, only different points from the flowchart shown in FIG. 9 will be described.

Figure 10:
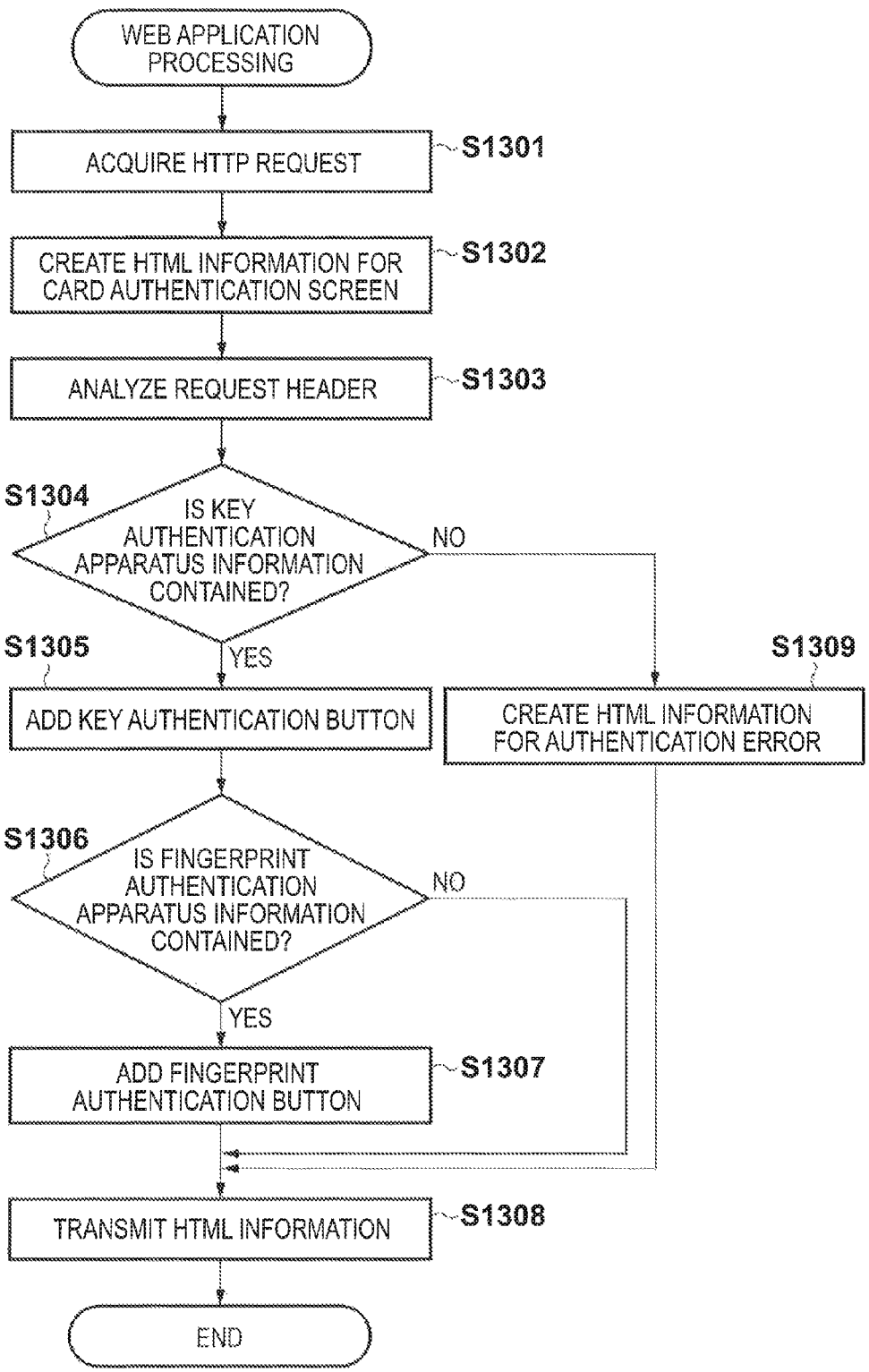
FIG. 10 is a flowchart illustrating card authentication screen creation processing by the Web application 410 according to the first embodiment.
Figure 11:
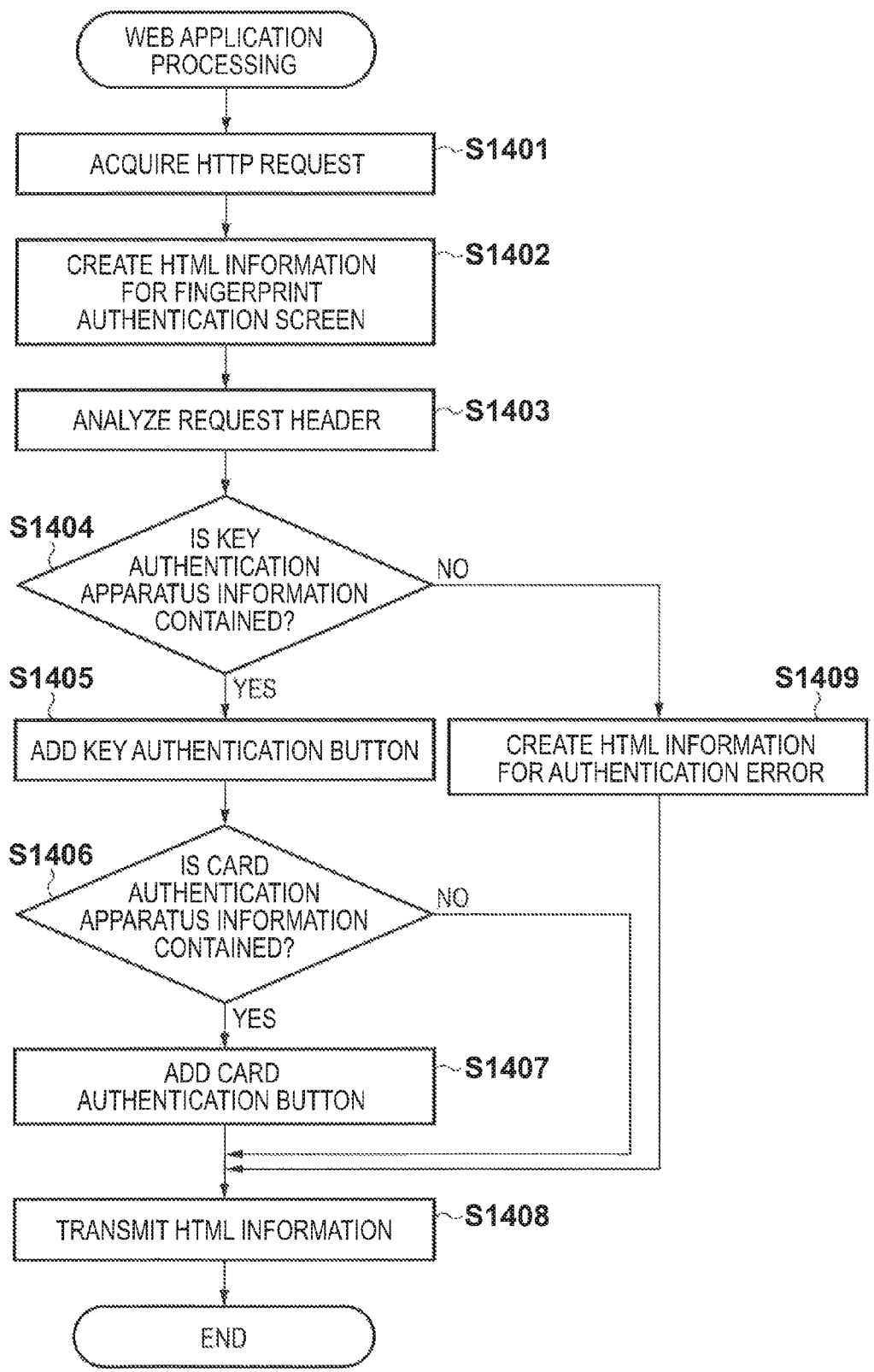
FIG. 11 is a flowchart illustrating fingerprint screen creation processing by the Web application 410 according to the first embodiment.

FIG. 10 shows a process of creating html information for the card authentication screen 600, and html information for the card authentication screen is created in step S1302. In the processing of steps S1304 to S1307, it is determined whether it is necessary to add a key authentication button and a fingerprint authentication button to the html information. If it is necessary to add each button, a process for adding the button is executed. FIG. 11 shows a process of creating html information for the fingerprint authentication screen 700, and html information for the fingerprint authentication screen is created in step S1402. In the processing of steps S1404 to S1407, it is determined whether it is necessary to add a key authentication button and a card authentication button to the html information. If it is necessary to add each button, a process for adding the button is executed.

<Authentication Operation>

Figure 12:
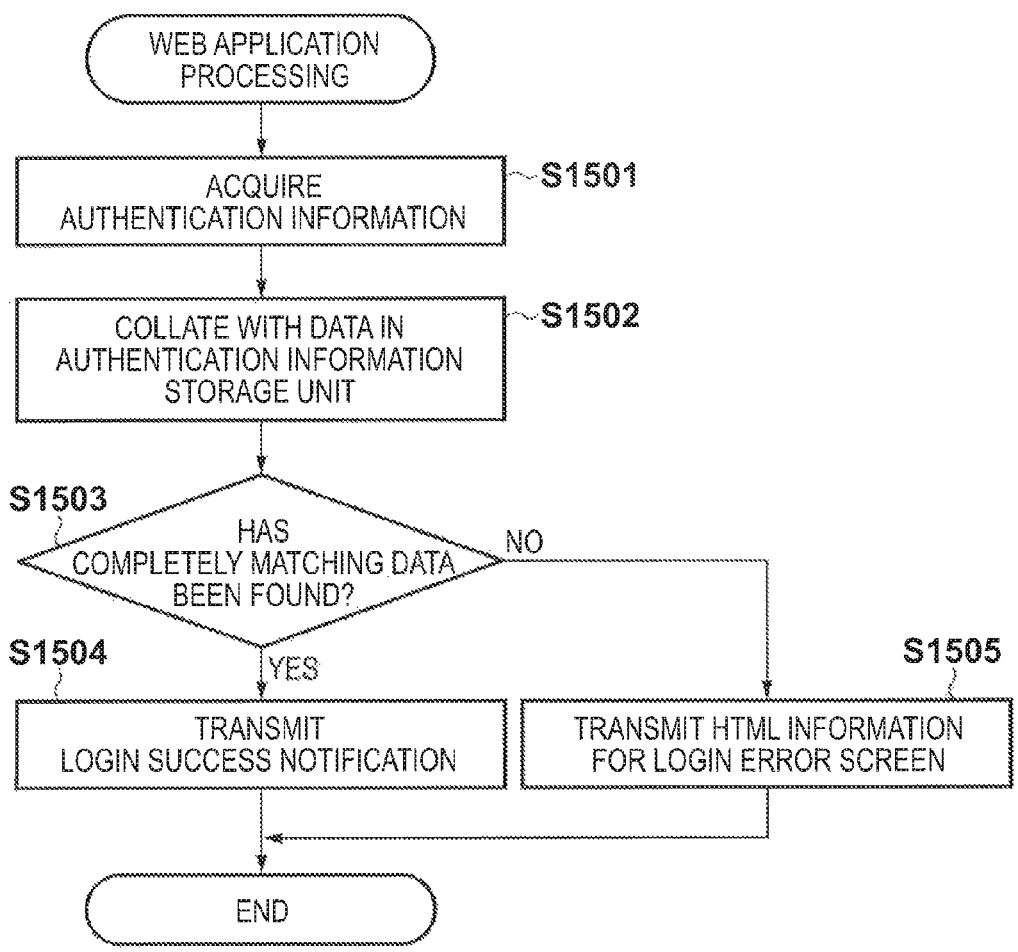
FIG. 12 is a flowchart illustrating an authentication operation by the Web application 410 according to the first embodiment.

The authentication operation (S1112) in the Web application 410 will now be described with reference to FIG. 12. Note that the processing to be explained below is implemented when the CPU 311 of the Web server 102 reads out and executes a control program stored in the ROM 312 or the like.

In step S1501, the Web application 410 acquires the authentication information which has been transmitted from the Web browser 430 in step S1111. In step S1502, the Web application 410 collates the authentication information acquired in step S1501 with data stored in the authentication information storage unit 420. In step S1503, the Web application 410 determines, as a result of the collation in step S1502, whether completely matching data has been found. If completely matching data has been found, the process advances to step S1504; otherwise, the process advances to step S1505.

In step S1504, the Web application 410 transmits a login success notification to the login application unit 440, and then ends the processing. On the other hand, in step S1505, the Web application 410 creates html information indicating a login error and transmits it to the Web browser 430, thereby terminating the processing. The Web browser 430 receives the error notification, and then displays the login error screen 900.

Second Embodiment

Figure 13:
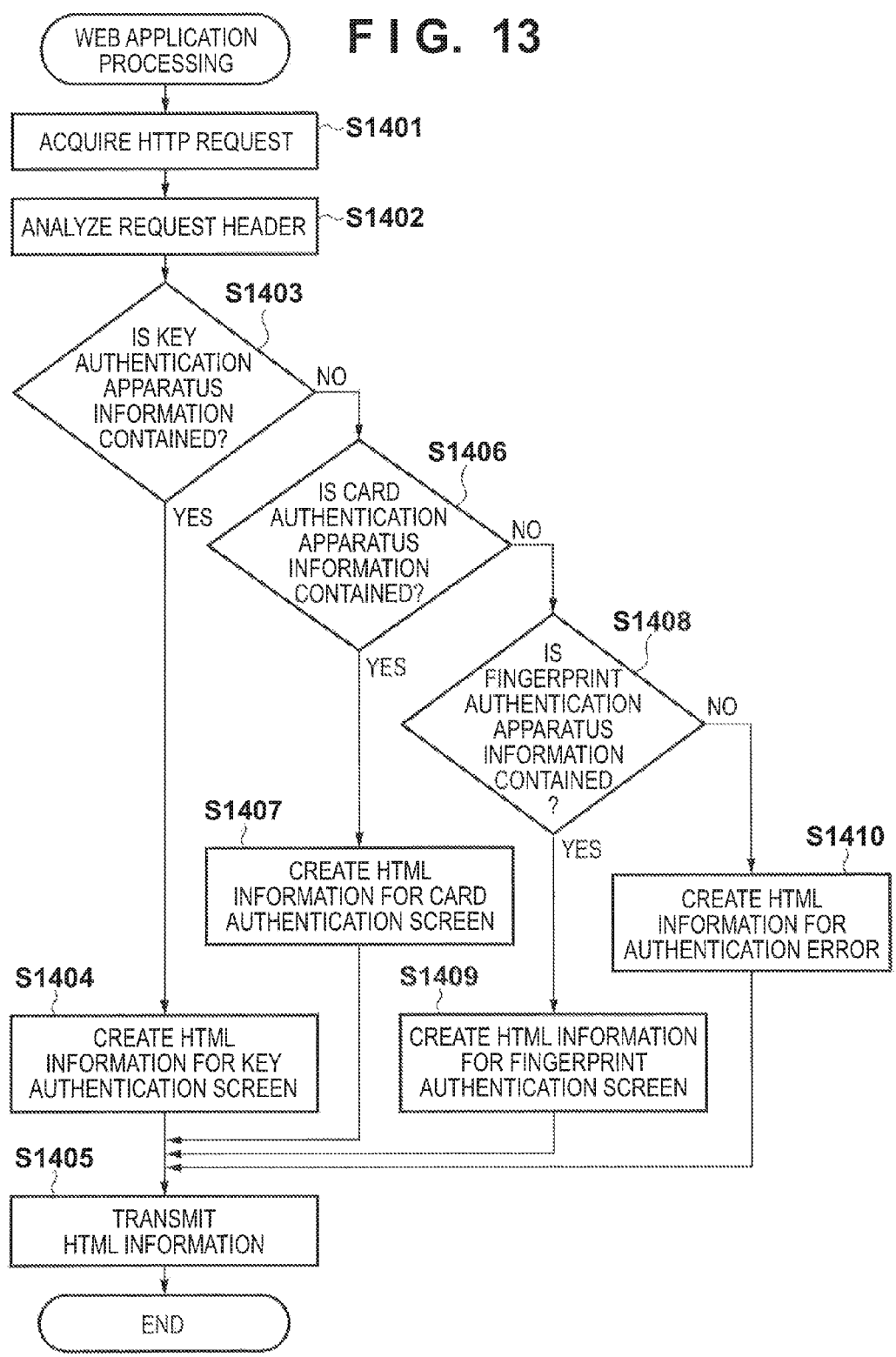
FIG. 13 is a flowchart illustrating authentication screen creation processing by a Web application 410 according to the second embodiment.

The second embodiment of the present invention will now be described with reference to FIG. 13. In this embodiment, when there are multiple authentication apparatuses connected to an MFP 101, authentication screens corresponding to the respective authentication apparatuses are displayed in a tab format. Assume that in consideration of labor necessary to input user authentication information, card authentication is preferentially displayed over key input authentication, and fingerprint authentication is preferentially displayed over card authentication. FIG. 13 shows the processing procedure of a Web application 410 in screen acquisition processing according to this embodiment. Note that the processing explained below is implemented when a CPU 311 of a Web server 102 reads out and executes a control program stored in a ROM 312 or the like.

In step S1401, the Web application 410 acquires an HTTP request. In step S1402, the Web application 410 analyzes the request header of the acquired HTTP request. In step S1403, the Web application 410 determines whether the request header contains key authentication apparatus information. If the header contains key authentication apparatus information, the process advances to step S1404; otherwise, the process advances to step S1406. In step S1404, the Web application 410 creates html information for a key authentication screen 500, and then advances the process to step S1405.

In step S1406, the Web application 410 determines whether the request header contains card authentication apparatus information. If the header contains card authentication apparatus information, the process advances to step S1407; otherwise, the process advances to step S1408. In step S1407, the Web application 410 creates html information for a card authentication screen 600, and then advances the process to step S1405.

In step S1408, the Web application 410 determines whether the request header contains fingerprint authentication apparatus information. If the header contains fingerprint authentication apparatus information, the process advances to step S1409; otherwise, the process advances to step S1410. In step S1409, the Web application 410 creates html information for a fingerprint authentication screen 700, and then advances the process to step S1405.

In step S1410, since it is indicated that the request header contains no authentication apparatus information, the Web application 410 creates html information for an authentication error, and then advances the process to step S1405. In step S1405, the Web application 410 transmits the created html information for an authentication screen to a Web browser 430. After that, the Web browser 430 renders an authentication screen based on the received html information. At this time, if authentication screen information for new authentication apparatus is transmitted, the newly received authentication screen is desirably displayed in front of other screens. With this processing, the card authentication screen 600 is preferentially displayed in front of the key authentication screen 500, and the fingerprint authentication screen 700 is preferentially displayed in front of the card authentication screen 600.

The screen information creation processing of the Web application 410 according to this embodiment has been described. By repeating this processing for each of the authentication apparatuses usable by the MFP 101, it is possible to display authentication screens in a tab format like a screen 800. As described above, according to this embodiment, it is possible to save a screen transition time due to communication with the Web application by switching between the authentication screens using a tab. Furthermore, by displaying an authentication screen which requires a shorter input time in front of other screens, it is possible to shorten a time required for user authentication.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-094369 filed on Apr. 20, 2011, which is hereby incorporated by reference herein in its entirety.

What is claimed is:

1. An information processing system in which an image processing apparatus being capable of connecting multiple authentication apparatuses for authenticating a user of the image processing apparatus and an information processing apparatus are communicably connected to each other,
the image processing apparatus comprising:
an acquisition unit that acquires, when a user requests a login operation, authentication apparatus information indicating at least one of the authentication apparatuses which has been connected to the image processing apparatus,
a login request unit that generates a login request containing the authentication apparatus information acquired by the acquisition unit to notify the information processing apparatus of the login request, and
a display control unit that displays, as a response for the login request, an authentication screen on a display unit using screen information sent from the information processing apparatus, the authentication screen corresponding to at least one of the authentication apparatuses which has been connected to the image processing apparatus, and
the information processing apparatus comprising:

a screen information generation unit that generates, when the login request unit sends the login request, screen information of an authentication screen for executing authentication using any one of the authentication apparatuses indicated by the authentication apparatus information, and
a screen information notification unit that notifies the image processing apparatus of the screen information, as a response for the login request, which has been generated by the screen information generation unit.

2. The system according to claim 1, wherein the image processing apparatus further comprises:
an acceptance unit that accepts authentication information indicating information of the user using the authentication apparatus selected via the authentication screen displayed by the display control unit, and
an authentication information notification unit that notifies the information processing apparatus of the authentication information accepted by the acceptance unit, and
wherein the information processing apparatus further comprises:
an authentication unit that executes authentication of the user using the authentication information sent by the authentication information notification unit and information stored, in advance, in a storage unit of the information processing apparatus, and
an authentication result notification unit that notifies the image processing apparatus of an authentication result by the authentication unit.

3. The system according to claim 1, wherein when the multiple authentication apparatuses are connected to the image processing apparatus, the authentication screen corresponds to one of the multiple authentication apparatuses, and includes buttons for transiting to authentication screens respectively corresponding to the other authentication apparatuses.

4. The system according to claim 1, wherein when the multiple authentication apparatuses are connected to the image processing apparatus, the authentication screen indicates a screen on which multiple authentication screens respectively corresponding to the multiple authentication apparatuses are displayed in a tab format.

5. The system according to claim 1, wherein the image processing apparatus further comprises a unit that notifies, when the authentication apparatus is newly connected to the image processing apparatus while the authentication screen is displayed, the information processing apparatus of the authentication apparatus information.

6. The system according to claim 1, wherein the authentication apparatus is connected to the image processing apparatus via a universal serial bus.

7. The system according to claim 6, wherein the authentication apparatus serves as a card authentication apparatus for acquiring authentication information from an ID card or a fingerprint authentication apparatus for acquiring authentication information from fingerprints.

8. An image processing apparatus which is communicably connected to an information processing apparatus and is capable of connecting multiple authentication apparatuses for authenticating a user of the image processing apparatus, comprising:
an acquisition unit that acquires, when a user requests a login operation, authentication apparatus information indicating at least one of the authentication apparatuses which has been connected to the image processing apparatus;

a login request unit that generates a login request containing the authentication apparatus information acquired by the acquisition unit to notify the information processing apparatus of the login request; and
a display control unit that displays, as a response for the login request, an authentication screen on a display unit using screen information sent from the information processing apparatus, the authentication screen corresponding to at least one of the authentication apparatuses which has been connected to the image processing apparatus.

9. An information processing apparatus which is communicably connected to an image processing apparatus being capable of connecting multiple authentication apparatuses for authenticating a user of the image processing apparatus, comprising:
a screen information generation unit that generates, when a login request for requesting a login operation of a user from the image processing apparatus, which contains authentication apparatus information indicating at least one of the authentication apparatuses which has been connected to the image processing apparatus, is received, screen information of an authentication screen for executing authentication using any one of the authentication apparatuses indicated by the authentication apparatus information; and
a screen information notification unit that notifies the image processing apparatus of the screen information, as a response for the login request, which has been generated by the screen information generation unit.

10. A control method for an information processing system in which an image processing apparatus being capable of connecting multiple authentication apparatuses for authenticating a user of the image processing apparatus and an information processing apparatus are communicably connected to each other, comprising:
in the image processing apparatus:
acquiring, by an acquisition unit, when a user requests a login operation, authentication apparatus information indicating at least one of the authentication apparatuses which has been connected to the image processing apparatus;
generating, by a login request unit, a login request containing the authentication apparatus information acquired to notify the information processing apparatus of the login request; and
displaying as a response for the login request, by a display control unit, an authentication screen on a display unit using screen information sent from the information processing apparatus, the authentication screen corresponding to at least one of the authentication apparatuses which has been connected to the image processing apparatus; and
in the information processing apparatus;
generating, by a screen information generation unit, when the login request is sent in the generating by the login request unit, screen information of an authentication screen for executing authentication using any one of the authentication apparatuses indicated by the authentication apparatus information; and
notifying, by a screen information notification unit, the image processing apparatus of the screen information, as a response for the login request, which has been generated in the generating by the screen information generation unit.

11. A control method for an image processing apparatus which is communicably connected to an information processing apparatus and is capable of connecting multiple authentication apparatuses for authenticating a user of the image processing apparatus, comprising:
acquiring, by an acquisition unit, when a user requests a login operation, authentication apparatus information indicating at least one of the authentication apparatuses which has been connected to the image processing apparatus;
generating, by a login request unit, a login request containing the authentication apparatus information acquired to notify the information processing apparatus of the login request; and
displaying as a response for the login request, by a display control unit, an authentication screen on a display unit using screen information sent from the information processing apparatus, the authentication screen corresponding to at least one of the authentication apparatuses which has been connected to the image processing apparatus.

12. A control method for an information processing apparatus which is communicably connected to an image processing apparatus being capable of connecting multiple authentication apparatuses for authenticating a user of the image processing apparatus, comprising:
generating, by a screen information generation unit, when a login request for requesting a login operation of a user from the image processing apparatus, which contains authentication apparatus information indicating at least one of the authentication apparatuses which has been connected to the image processing apparatus, is received, screen information of an authentication screen for executing authentication using any one of the authentication apparatuses indicated by the authentication apparatus information; and
notifying, by a screen information notification unit, the image processing apparatus of the screen information, as a response for the login request, which has been generated in the generating.

13. A non-transitory computer-readable storage medium storing a computer program for causing a computer to execute a control method for an information processing system in which an image processing apparatus being capable of connecting multiple authentication apparatuses for authenticating a user of the image processing apparatus and an information processing apparatus are communicably connected to each other, the control method comprising:
in the image processing apparatus:
acquiring, by an acquisition unit, when a user requests a login operation, authentication apparatus information indicating at least one of the authentication apparatuses which has been connected to the image processing apparatus;
generating, by a login request unit, a login request containing the authentication apparatus information acquired to notify the information processing apparatus of the login request; and
displaying as a response for the login request, by a display control unit, an authentication screen on a display unit using screen information sent from the information processing apparatus, the authentication screen corresponding to at least one of the authentication apparatuses which has been connected to the image processing apparatus; and
in the information processing apparatus:
generating, by a screen information generation unit, when the login request is sent in the generating by the login request unit, screen information of an authentication screen for executing authentication using any one of the authentication apparatuses indicated by the authentication apparatus information; and notifying, by a screen information notification unit, the image processing apparatus of the screen information, as a response for the login request, which has been generated in the generating by the screen information generation unit.

14. A non-transitory computer-readable storage medium storing a computer program for causing a computer to execute a control method for an image processing apparatus which is communicably connected to an information processing apparatus and is capable of connecting multiple authentication apparatuses for authenticating a user of the image processing apparatus, the control method comprising:

acquiring, by an acquisition unit, when a user requests a login operation, authentication apparatus information indicating at least one of the authentication apparatuses which has been connected to the image processing apparatus;

generating, by a login request unit, a login request containing the authentication apparatus information acquired to notify the information processing apparatus of the login request; and displaying as a response for the login request, by a display control unit, an authentication screen on a display unit using screen information sent from the information processing apparatus, the authentication screen corresponding to at least one of the authentication apparatuses which has been connected to the image processing apparatus.

15. A non-transitory computer-readable storage medium storing a computer program for causing a computer to execute a control method for an information processing apparatus which is communicably connected to an image processing apparatus being capable of connecting multiple authentication apparatuses for authenticating a user of the image processing apparatus, the control method comprising:

generating, by a screen information generation unit, when a login request for requesting a login operation of a user from the image processing apparatus, which contains authentication apparatus information indicating at least one of the authentication apparatuses which has been connected to the image processing apparatus, is received, screen information of an authentication screen for executing authentication using any one of the authentication apparatuses indicated by the authentication apparatus information; and notifying, by a screen information notification unit, the image processing apparatus of the screen information, as a response for the login request, which has been generated in the generating.

* * * * *